United States Patent
Dong et al.

(10) Patent No.: US 12,400,541 B2
(45) Date of Patent: Aug. 26, 2025

(54) MULTI-OBJECTIVE OPTIMIZATION CONTROL METHOD AND SYSTEM FOR COOPERATIVE RAMP MERGING OF CONNECTED VEHICLES ON HIGHWAY

(71) Applicant: SOUTHEAST UNIVERSITY, Nanjing (CN)

(72) Inventors: Hanxuan Dong, Nanjing (CN); Fan Ding, Nanjing (CN); Hailong Zhang, Nanjing (CN); Huachun Tan, Nanjing (CN); Linhui Ye, Nanjing (CN); Yunqi Dai, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 283 days.

(21) Appl. No.: 18/112,541

(22) Filed: Feb. 22, 2023

(65) Prior Publication Data
US 2023/0267829 A1    Aug. 24, 2023

Related U.S. Application Data

(63) Continuation of application No. PCT/CN2022/102755, filed on Jun. 30, 2022.

(51) Int. Cl.
*G08G 1/01* (2006.01)
*G06Q 30/0207* (2023.01)
(Continued)

(52) U.S. Cl.
CPC ....... *G08G 1/0129* (2013.01); *G06Q 30/0207* (2013.01); *G06Q 50/40* (2024.01);
(Continued)

(58) Field of Classification Search
CPC .. G08G 1/0129; G08G 1/0116; G08G 1/0137; G08G 1/052; G08G 1/207; G08G 1/0112; G08G 1/0145; G08G 1/164; G08G 1/22; G08G 1/096725; G08G 1/096783; G08G 1/096775; G08G 1/0968;
(Continued)

(56) References Cited

U.S. PATENT DOCUMENTS 9,779,628 B2 * 10/2017 Yamashiro ............... G08G 1/22
11,897,518 B2 * 2/2024 Shalev-Shwartz ...... G06F 18/29
(Continued)

*Primary Examiner* — Fadey S. Jabr
*Assistant Examiner* — Faris Asim Shaikh
(74) *Attorney, Agent, or Firm* — CBM PATENT CONSULTING, LLC

(57) ABSTRACT

State data of vehicles in a control area is collected, then time of starting control and selection of controlled vehicles are decided according to a position of a ramp merging vehicle, information is transmitted into a traffic control module by means of a data transmission module, and an artificial intelligence based ramp merging multi-objective control model ensures efficient, safe, and energy-saving operation of overall traffic of a road while completing ramp merging by means of a vehicle traveling track in the cooperative ramp control area. Compared with a traditional method, the present invention greatly promotes merging of the ramp vehicles, and different from other methods having the defect of transforming the problem of ramp merging into the problem of vehicle sequencing, the present invention greatly improves efficiency of ramp merging.

9 Claims, 2 Drawing Sheets

(51) Int. Cl.
*G06Q 50/40* (2024.01)
*G08G 1/00* (2006.01)
*G08G 1/052* (2006.01)

(52) U.S. Cl.
CPC ......... *G08G 1/0116* (2013.01); *G08G 1/0137* (2013.01); *G08G 1/052* (2013.01); *G08G 1/207* (2013.01)

(58) Field of Classification Search
CPC .... G08G 1/096844; G08G 1/012; G08G 1/16; G08G 1/166; G08G 1/20; G06Q 30/0207; G06Q 50/40; H04W 4/44; H04W 4/029; H04W 4/027; H04W 4/025; H04W 4/024; G06N 20/00; G06N 3/08
See application file for complete search history.

(56) References Cited

U.S. PATENT DOCUMENTS

| | | | | |
|---|---|---|---|---|
| 12,139,132 | B2* | 11/2024 | Shalev-Shwartz | B60T 7/18 |
| 2012/0283942 | A1* | 11/2012 | T'Siobbel | G01C 21/26 |
| | | | | 701/410 |
| 2017/0220854 | A1* | 8/2017 | Yang | G06V 20/46 |
| 2017/0369055 | A1* | 12/2017 | Saigusa | G08G 1/096775 |
| 2018/0267547 | A1* | 9/2018 | Michalakis | G08G 1/096725 |
| 2019/0310648 | A1* | 10/2019 | Yang | G06N 20/20 |
| 2019/0329763 | A1* | 10/2019 | Sierra Gonzalez | |
| | | | | B60W 30/0956 |
| 2020/0073406 | A1* | 3/2020 | Yamada | G05D 1/0287 |
| 2020/0198472 | A1* | 6/2020 | Booth | B60L 50/15 |
| 2020/0198633 | A1* | 6/2020 | Fujimaki | B60W 30/18163 |
| 2020/0249674 | A1* | 8/2020 | Dally | G05D 1/0221 |
| 2020/0250437 | A1* | 8/2020 | Rahimpour | G05D 1/0214 |
| 2020/0273329 | A1* | 8/2020 | Xiong | G08G 1/096783 |
| 2020/0294394 | A1* | 9/2020 | Guo | G08G 1/096783 |
| 2020/0380870 | A1* | 12/2020 | Eguchi | G05D 1/0094 |
| 2021/0256851 | A1* | 8/2021 | Uenoyama | G08G 1/096741 |
| 2021/0295703 | A1* | 9/2021 | Jalali | G08G 1/096741 |
| 2021/0300412 | A1* | 9/2021 | Dingli | B60W 50/0098 |
| 2022/0258729 | A1* | 8/2022 | Kim | H04W 4/40 |
| 2023/0245223 | A1* | 8/2023 | Okai | G06Q 30/0261 |
| | | | | 705/307 |
| 2024/0071223 | A1* | 2/2024 | Oyama | G08G 1/164 |
| 2024/0140423 | A1* | 5/2024 | Kobayashi | B60W 30/165 |

* cited by examiner

MULTI-OBJECTIVE OPTIMIZATION CONTROL METHOD AND SYSTEM FOR COOPERATIVE RAMP MERGING OF CONNECTED VEHICLES ON HIGHWAY

CROSS REFERENCES

This application is the continuation application of International Application No. PCT/CN2022/102755 filed on 30 Jun. 2022 which designated the U.S. and claims priority to Chinese Application No. CN202210164445.8 filed on 23 Feb. 2022, the entire contents of each of which are hereby incorporated by reference.

TECHNICAL FIELD

The present invention belongs to the technical field of intelligent traffic vehicle-road cooperation, and in particular to a multi-objective optimization control method and system for cooperative ramp merging of connected vehicles on a highway.

BACKGROUND ART

With rapid growth of national economy and continuous promotion of urbanization, increased regional trades have prompted rapid growth in urban trips, thereby bringing challenges to efficient and safe operation of a highway. An on-ramp area, serving as a bottleneck affecting traffic efficiency of the highway, is a particularly eye-catching problem in traffic management. A common ramp control method is to control the rate of on-ramp inflow by adjusting macroscopic traffic flow state variables (such as density and flow). However, a ramp metering strategy aims to prioritize the efficiency of a trunk line and attempt to prevent congestion. With an incapability to control movement of a single vehicle to promote a merging process, the method fail to successfully merge in a case of a number of vehicles on a main line, resulting in congestion and safety problems.

In consideration of excellent dynamic control capabilities of intelligent connected vehicles, a cooperative ramp merging strategy was provided, to better control merging by adjusting tracks of the vehicles, so as to ensure traffic efficiency and safety. Common merging strategies can be divided into heuristic methods (rule-based methods or fuzzy methods) and optimal methods. However, heuristic algorithms usually require domain-specific expertise to finely design certain driving rules, lack of adaptability to other unknown situations, and have difficulty in achieving optimal control. Optimization algorithms such as a Pontryagin's maximum principle (PMP) and dynamic programming (DP) lack of self-learning capabilities, have difficulty in achieving global optimization in a complex on-ramp merging environment, and lack of adaptability to problems, and although reinforcement learning based optimization algorithms can improve adaptability of a system to unknown environments, existing strategies are too focused on reward shaping and model construction to fundamentally solve the problem of cooperative ramp merging. In essence, it is necessary for cooperative ramp merging to satisfy multi-objective long-term and short-term feedback at the same time. That is, it is necessary to consider the influence on long-term objectives during execution of short-term actions, but rewards for on-ramp merging evaluation are sparse and long-term for the merging problem. In this case, a traditional reinforcement learning method has difficulty in avoiding local optimality and instability when dealing with sparse reward problem, thereby influencing traffic efficiency and safety of vehicles in a ramp area.

Aiming at the above problem, the inventors have provided a related paper for a battery life oriented on-ramp reinforcement learning method, which initially solves the problem of on-ramp merging. However, the method is mainly oriented to battery health, is an implementation case in a specific application scenario of a new energy vehicle, but is not applicable to a real traditional mixed ramp merging scenario of a fuel vehicle and the new energy vehicle; and moreover, the paper does not involve ramp merging vehicle selection and main road merging gap selection, and lacks of key links in actual ramp merging application. Aiming at the above problem, the present patent, on the basis of specific cases provided by the paper, provided a multi-objective optimization control method and system for cooperative ramp merging of connected vehicles on a highway, which establish a comprehensive and complete framework and an advanced technology methodology for the problem of on-ramp vehicle merging.

SUMMARY

In order to solve the above technical problem, the present invention provides a multi-objective optimization control method and system for cooperative ramp merging of connected vehicles on a highway, which ensure efficient, safe, and energy-saving operation of overall traffic of a road while completing ramp merging by means of a vehicle traveling track in a cooperative ramp control area.

The present invention provides a multi-objective optimization control method for cooperative ramp merging of connected vehicles on a highway. The control method includes:

step 1, collecting state data of vehicles in a control area of the highway, and analyzing and processing the state data, the control area including an intersection of a main road and a ramp, a merging area, and partial road segments of the main road, the ramp and an acceleration lane of the highway, a range of the control area being a communication range of a road side unit, the road side unit being arranged at the intersection of the main road and the ramp of the highway, and the merging area being a preselected area including the partial road segments of the acceleration lane and road segments of the main road parallel to the partial road segments of the acceleration lane;

step 2, constructing a set of alternatives for a ramp merging vehicle, an auxiliary vehicle, and a guidance vehicle according to the state data of the vehicles in the control area;

step 3, inputting the set of alternatives into an artificial intelligence based ramp merging multi-objective control model separately, and further determining selection of the auxiliary vehicle and the guidance vehicle by means of an optimal value strategy;

step 4, according to the auxiliary vehicle, the guidance vehicle, and the merging vehicle that are selected, controlling and adjusting accelerations of the auxiliary vehicle and the guidance vehicle, to ensure safe merging of the ramp merging vehicle from the acceleration lane into the main road in the selected merging area; and step 5, collecting state data of the ramp merging vehicle and the auxiliary vehicle, of which the accelerations are adjusted, and returning to step 4 to adjust accelerations at a next moment.

As a further improvement of the control method of the present invention, in step 1, the state data of the vehicles includes positions, speeds, power battery states, and corresponding moment information of the vehicles in the control area.

As a further improvement of the control method of the present invention, in step 1, the analyzing and processing the state data includes: analyzing the data, extracting features, and fusing information.

As a further improvement of the control method of the present invention, in steps 2 and 3, the optimal value strategy selected for the ramp merging vehicle, the guidance vehicle, and the auxiliary vehicle is as follows:

1) selecting the merging vehicle: setting a vehicle, of which a front bumper is closest to a ramp exit line, on the ramp as the merging vehicle, and obtaining state information of all the vehicles in the control area in first t time steps;
2) according to position information of all the vehicles, preliminary selecting each z main road vehicles in the rear of and in front of the merging vehicle as alternative vehicles of the auxiliary vehicle and the guidance vehicle on the basis of front and rear relations between main line vehicles and the merging vehicle;
3) in all the alternative vehicles, selecting two vehicles that are adjacent to each other as a group of guidance vehicle and auxiliary vehicle, to construct an alternative set AL of the guidance vehicle and the auxiliary vehicle of the merging vehicle; and
4) using a traversal method to substitute combinations in the alternative set AL into the artificial intelligence based ramp merging multi-objective control model separately, and determining the merging vehicle, the auxiliary vehicle, and the guidance vehicle that are finally selected on the basis of a value function Q of the model.

As a further improvement of the control method of the present invention, the state information of all the vehicles in the control area in the first time steps includes speeds, positions, and accelerations.

As a further improvement of the control method of the present invention, in step 4) of the optimal value strategy selected for the merging vehicle, the auxiliary vehicle, and the guidance vehicle, constructing an objective function and constraints of the artificial intelligence based ramp merging multi-objective control model successfully merged into a moment includes:

1) setting $\tau$ as a safe merging moment to construct a position and speed relation to be satisfied by the guidance vehicle, the auxiliary vehicle, and the ramp merging vehicle at the safe merging moment:

$$x_m(\hat{t}) \leq x_l(\hat{t}) - (L_1+s_0) - \tau v_m(\hat{t}) \quad (1)$$

$$x_m(\hat{t}) \geq x_f(\hat{t}) + (L_1+s_0) + \tau v_f(\hat{t}) \quad (2)$$

$$v_m(\hat{t}) \leq v_l(\hat{t}) \quad (3)$$

$$v_m(\hat{t}) \geq v_f(\hat{t}) \quad (4)$$

$$x_m(\hat{t}) \in [d_{min}, d_{max}] \quad (5)$$

$x_l$, $v_l$ and $a_l$ representing a position, a speed, and an acceleration of the guidance vehicle; $x_f$, $v_f$ and $a_f$ representing a position, a speed, and an acceleration of the auxiliary vehicle; $x_m$, $v_m$ and $a_m$ representing a position, a speed, and an acceleration of the ramp merging vehicle; $\tau$ being a constant time interval, $L_1$ being a length of the vehicle, $s_0$ being a pause gap, $d_{min}$ and $d_{max}$ being a start point and an end point of the merging area respectively, and the merging area having a length of $d_{max}-d_{min}$; and the equation sequentially representing, from top to bottom, that the ramp merging vehicle is at the rear of the guidance vehicle, the ramp merging vehicle is in front of the auxiliary vehicle, the ramp merging vehicle and the guidance vehicle have a consistent speed, the ramp merging vehicle and the auxiliary vehicle have a consistent speed, and the ramp merging vehicle is safely merged from the acceleration lane into the main road in the selected merging area; and 2) under the condition of satisfying 1), further constructing an objective function C including, but not limited to, objectives of driving comfort, vehicle energy consumption, traffic efficiency, etc;

$$\min C(\hat{t}) = \min \int_0^{\hat{t}} \left( c^1 C_1(\hat{t}) + c^2 C_2(\hat{t}) + \ldots + c^n C_n(\hat{t}) \right) \quad (6)$$

$C_n(\hat{t})$ representing cost functions of different objectives, and $c^n$ representing parameters.

As a further improvement of the control method of the present invention, in step 4) of the optimal value strategy selected for the merging vehicle, the guidance vehicle and the auxiliary vehicle, the artificial intelligence based ramp merging multi-objective control model is solved by using a reinforcement learning actor-critic algorithm, which specifically includes:

1) establishing a state space $\mathcal{S}$ and a behavior space $\mathcal{A}$: selecting, according to the state data of the guidance vehicle, the auxiliary vehicle, and the ramp merging vehicle, six-dimensional state information $s=\{x_l, x_m, x_f, v_l, v_m, v_f\}$ to represent the most relevant influence factor in an environment, $s \in \mathcal{S}$, and selecting a control behavior strategy $a=\{a_m, a_f\}$, $a \in \mathcal{A}$ on the basis of a control object;
2) establishing an optimal objective: according to a vehicle constraint relation at a safe merging moment $\hat{t}$, constructing an optimal objective space set $g^*=\{g^*_1, g^*_2, g^*_3, g^*_4, g^*_5\}$ for ramp merging, $g^* \in \mathcal{G}$, $\mathcal{G}$ being an objective space set, $g^*_1$ representing that equation (1) that the merging vehicle is at the rear of the guidance vehicle is satisfied, $g^*_2$ representing that equation (2) that the ramp merging vehicle is in front of the auxiliary vehicle is satisfied, $g^*_3$ representing that equation (3) that the ramp merging vehicle and the guidance vehicle have a consistent speed is satisfied, $g^*_4$ representing that equation (4) that the ramp merging vehicle and the auxiliary vehicle have a consistent speed is satisfied, and $g^*_5$ representing that equation (5) that the ramp merging vehicle is safely merged from the acceleration lane into the main road in the selected merging area is satisfied;
3) constructing an objective space: on the basis of classifications included by the optimal objective space set $g^*=\{g^*_1, g^*_2, g^*_3, g^*_4, g^*_5\}$ in 2), establishing the objective space set $\mathcal{G}$ to satisfy $g=\{g_1, g_2, g_3, g_4, g_5\}$, $g_1$ representing a position relation between the ramp merging vehicle and the guidance vehicle, $g_2$ representing a position relation between the ramp merging vehicle and the auxiliary vehicle, $g_3$ representing a speed relation between the ramp merging vehicle and the guidance vehicle, $g_4$ representing a speed relation between the ramp merging vehicle and the auxiliary vehicle, and $g_5$ representing a relation between a position of the ramp merging vehicle and the merging area;

4) constructing rewards: with a reward function being r: $S \times \mathcal{A} \times \mathcal{G} \rightarrow R$, introducing, according to safe, efficient and comfortable traveling requirements, at least two short-term objective rewards under the condition that the reward r(s, a, g*) at each time step includes a long-term objective merging reward $R_m(t)$, the long-term objective merging reward $R_m(t)$ that must be included being represented as follows:

$$R_m(t) = \begin{cases} 1, & \text{safe successful merging} \\ 0, & \text{the merging vehicle can(may)be merged, } but g^* \text{ is not satisfied} \\ -1, & \text{others} \end{cases} \quad (7)$$

5) obtaining a data link: according to state, objective, strategy and reward data of the $t^{th}$ time step obtained from 1) to 4), obtaining the data link $(s_t \| g^*, a, r, s_{t+1} \| g^*)$, and storing the data into an intelligent optimization module, $s \| g^*$ representing a connection between a state s and an objective $g^*$;

6) expanding data exploration, and optimizing the objective space: further providing a multi-experience replay based virtual objective construction algorithm, to introduce virtual objectives, to optimize the objective space, and simultaneously expand the data exploration; and 7) in each time step, according to the data link stored by the intelligent optimization module, on the basis of an actor-critic algorithm framework, training a merging control strategy by means of a deep neural network taking $\theta_A$ as a parameter, the strategy directly outputting an action to control acceleration magnitudes and states of the ramp merging vehicle and the auxiliary vehicle and objective inputs, strategy optimization aiming at to find an optimal behavior strategy a, to maximize a return expectation of a whole trip, and finally, the optimal control strategy being output by means of forward delivery of a trained network: $a = \pi(s, g|\theta_A)$.

As a further improvement of the control method of the present invention, the short-term objective rewards in construction of the rewards of the reinforcement learning actor-critic algorithm includes, but not limited to, an energy-saving reward $R_e(t)$, a comfort reward $R_p(t)$, an efficient traffic reward $R_s(t)$, and a battery state reward $R_b(t)$; and a coupled Chebyshev based multi-objective reward optimization method for the reinforcement learning actor-critic algorithm includes:

(1) determining optimized reward terms: under the condition of assuming that the number of a variety of introduced real-time short-term objectives after successful merging is $n_r$, determining the number of the optimized reward terms for a merging problem as $n_r$;

(2) determining a super-ideal optimal value of each reward: constructing the super-ideal optimal value $r^{**}_i = r^*_i + \vartheta_i$ (i=1, 2, ... $n_r$, of each objective, $r^*_i$ being an ideal value, and $\vartheta_i$ being a constant according to selection of empirical data, and representing a degree that the super-ideal optimal value is better than the ideal value;

(3) constructing a generalized weighted Chebyshev optimization model for a multi-objective problem: with setting $\lambda_i$ as a Chebyshev weight of a short-term objective, transforming the multi-objective problem into a generalized weighted Chebyshev multi-objective problem as follows:

$$\min\left\{F_c + \rho \sum_{i=1}^{n_r} (r^{**}_i - r_i)\right\} \quad (14)$$

The following condition being satisfied:

$$F_c - \lambda_i(r^{**}_i - r_i) \geq 0 \quad 1 \leq i \leq n_r$$

$r_i$ being an unrestricted variable $1 \leq i \leq n_r$ $$F_c \geq 0 \quad (15)$$

$F_c$ being a weighted Chebyshev norm, $F_c = \max\{\lambda_i(r^{}_i - r_i)\}$ representing a maximum deviation between each objective and the super-ideal optimal value; and $$\rho \sum_{i=1}^{n_r} (r^{}_i - r_i)$$

being a term ensuring the stable algorithm, usually, $\rho = 0.001$, and a computation equation of $\lambda_i$ being referred to as follows:

$$\lambda_i = \begin{cases} \frac{1}{(r^{}_i - r_i)}\left[\sum_{i=1}^{n_r} \frac{1}{(r^{}_i - r_i)}\right]^{-1} & r_i \neq r^{}_i \\ 1 & r_i = r^{}_i, \text{ but } \exists i, \text{ and } r_i = r^{}_i \\ 0 & r_i \neq r^{}_i \end{cases} \quad (16)$$

(4) constructing a reward function as:

$$R_m(t) = \begin{cases} 1, & \text{safe successful merging} \\ 0, & \text{the merging vehicle can(may)be merged, } but g^* \text{ is not satisfied.} \\ -1, & \text{others} \end{cases} \quad (17)$$

As a further improvement of the control method of the present invention, the multi-experience replay based virtual objective construction algorithm provided in construction of the rewards of the reinforcement learning actor-critic algorithm includes:

(1) constructing multi-experience virtual objectives and optimizing the objective space at at time step: on the basis of the objective g* and the data link $(s_t \| g^*, a, r, s_{t+1} \| g^*)$ at the t time step, constructing a fully connected neural network H, $g = H_\varphi(s, g^*)$ taking 4 as a parameter, to obtain 1 virtual objectives in a current state: $g^1 = H_\varphi(s_t, g^*), g^2 = H_\varphi(s_{t+1}, g^*), \ldots, g^l = H_\varphi(s_{t+l-1}, g^*)$;

(2) optimizing data exploration on the basis of the optimized objective space: constructing 1 virtual objective data links on the basis of the obtained 1 virtual objectives: $(s_t \| g^1, a, r, S_{t+1} \| g^1), (s_t \| g^2, a, r, s_{t+1} \| g^2), \ldots, (s_t \| g_l, a, r, s_{t+1} \| g^l)$; and storing the virtual objective data links into the intelligent optimization module;

(3) optimizing data exploration at a full time step: repeating (1) and (2) for each time step to complete data exploration and objective space optimization at all time steps;

(4) selecting virtual objective effectiveness on the basis of an artificial intelligence model: training the artificial intelligence model according to an optimized data set, and selecting, according to a training result, an optimal virtual objective data link at each time step; and (5) verifying the fully connected neural network H for the virtual objectives: according to the optimal virtual objective data link at each time step, verifying the parameter φ of the fully connected neural network H for the virtual objectives, to constantly improve accuracy of generation of the virtual objectives, so as to ensure algorithm performance and a training speed.

The present invention provides a system based on a multi-objective optimization control method for cooperative ramp merging of connected vehicles on a highway. The system includes an information collection module, a data transmission module, a traffic control module, and an intelligent optimization module, where the information collection module is used for collecting state data of vehicles in a control area of a highway, analyzing and processing the state data, and selecting a ramp merging vehicle, an auxiliary vehicle, and a guidance vehicle;

the information collection module includes an in-vehicle unit, and a road side unit, the road side unit being arranged at an intersection of a main road and a ramp of a highway, the road side unit being used for collecting positions, speeds and corresponding moment information of the vehicles in the control area, and being further used for collecting time of determining the ramp merging vehicle, and time when a front bumper reaches a ramp exit line, and the in-vehicle unit being used for collecting power battery states and corresponding moment information of the vehicles in the control area;

the data transmission module is used for using a mobile communication technology as a subject information transmission communication mode to assist one or two of wireless communication modes of wireless fidelity/ bluetooth (WiFi/BT), and dedicated short range communications (DSRC) to transmit data between the information collection module and the traffic control module, the traffic control module and the intelligent optimization module;

the traffic control module is used for obtaining, according to the state data of the vehicles provided by the information collection module, a behavior strategy a, an objective g and a reward r that are optimal in real time, sending the behavior strategy to the in-vehicle unit for real-time control of the vehicles, and further sending the behavior strategy a, the objective g and the reward r that are optimal to the intelligent optimization module; and the intelligent optimization module is used for storing data sent by the traffic control module, optimizing a ramp merging multi-objective control model on the basis of an alternative set AL of the vehicles selected in step 3) and an optimization algorithm provided in step 4), and transmitting the optimized model to the traffic control module.

Beneficial Effects

The present invention uses the above technical solution, and has the following technical effects compared with the prior art:

1. The present invention promotes, by controlling the vehicles on two lanes of the ramp merging area, a process of ramp merging, solves the problem of queuing caused by ramp vehicle merging delay caused by a traditional ramp control means only using flow rate control, and further actively promotes merging of the ramp vehicles on the premise of ensuring traffic capability of a main line, thereby greatly improving traffic efficiency in the ramp area; and a single-vehicle control method also ensures safe travel between the vehicles.

2. The present invention uses reinforcement learning for single-vehicle-controlled ramp merging, which is different from other single-vehicle-controlled ramp merging methods. Reinforcement learning may constantly explore and optimize the control strategy from historical data without constructing complex models, and moreover, the algorithm further has some robustness and adaptability due to diversity of exploration.

3. The present invention introduces a multi-experience virtual objective construction method, and the steps of objective space optimization and data exploration, thereby greatly improving data exploration efficiency, effectively solving the problems of long-term reward sparsity and a coupled relation between long rewards and short rewards in multi-objective ramp control, and ensuring safe and effective multi-objective ramp merging.

4. Compared with a paper published by the inventors, the present invention is mainly improved as follows:

1) Different from a battery health oriented merging method only for a new energy vehicle in the paper, the present invention provides a merging method for a mixed ramp scenario applicable to a variety of vehicles (including, but not limited to, traditional fuel vehicles, new energy vehicles, etc.), and the present invention provides a key technical link applied to a real merging scenario of the highway.

2) The present invention further optimizes vehicle constraints at the safe and successful merging moment, and further enriches a selection algorithm for the guidance vehicle, the auxiliary vehicle and the merging vehicle in the control area, and compared with a simple selection mode in the paper, the selection solution of the present invention may obtain the optimal vehicle selection solution, thereby further improving an optimal solution of the algorithm, and making running of the vehicles more energy-saving, efficient and stable.

3) The present invention further optimizes an importance level of the long-term rewards and the short-term rewards, and reserves an interface for objective introduction of the present invention for different practical situations, and the present invention determines a coefficient relation between the short-term rewards, thereby ensuring that the present invention may be adapted to situations having a variety of different objectives, and further improving the scope of application of the present invention.

4) The present invention further optimizes a data exploration algorithm provided by the article, introduces a multi-experience virtual objective construction method, which is different from simple selection of a next state by the paper, further improves efficiency of data utilization, improves a direction and correctness of data exploration, and greatly avoids occurrence of dangerous situations such as collision.

DETAILED DESCRIPTION OF THE EMBODIMENTS

Figure 1:
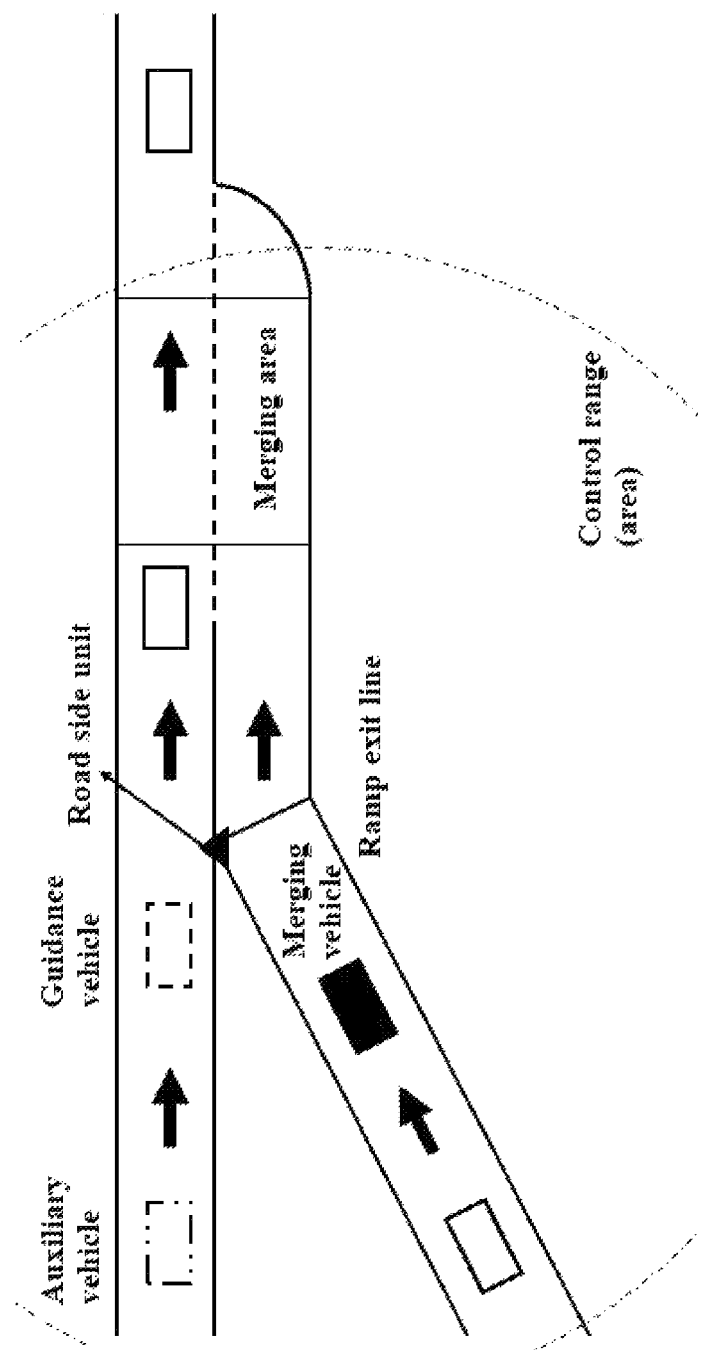
FIG. 1 is a schematic diagram of a merging scenario of a highway provided in the present invention.

The present invention will be further described in detail below in combination with the accompanying drawings and particular embodiments.

A method provided in the present invention is based on assumptions as follows: 1) network connected vehicles need to have necessary capabilities to transmitting information and implement instructions, that is, the network connected vehicles have the capability to interact information by means of an in-vehicle unit, and the vehicles fully execute control instructions; 2) a ramp control area includes an intersection of a main road and a ramp, a ramp merging area and partial road segments of a main line and the ramp, and a control range of the control area is a communication range of a road side unit; 3) the merging area has a fixed length, i.e., $d_m = d_{max} - d_{min}$; 4) delays in information transmission, data processing and computation, and instruction execution are ignored, that is, it is assumed that a running speed of each module is enough to support running of a system; and 5) influences of lateral movement and temperatures of the vehicles on the vehicles are ignored.

A multi-objective optimization control system for cooperative ramp merging of connected vehicles on a highway provided in the present invention includes an information collection module, a data transmission module, a traffic control module, and an intelligent optimization module.

1) The information collection module collects, by means of an in-vehicle unit and a road side unit, state information such as speeds, positions, and power battery states and corresponding moment information of vehicles in a control area and start moment information of merging of a ramp vehicle (a selected moment of a merging vehicle), and analyzing and processing the data, and the analyzing and processing the data include, but not limited to, analyze the data, extract features, fuse information, etc.; and information collection cooperation of the in-vehicle unit and the road side unit included in the information collection module is as follows:

(1) the road side unit is responsible for collecting traffic state information, such as the speeds and positions of the vehicles in the area, and the start moment of merging of the ramp merging vehicle; and (2) the in-vehicle unit is responsible for collecting vehicle related parameter information, such as engine state information, battery state information, and gear information. A power composition of a network connected vehicle designed in the present invention includes: a fuel vehicle, a pure electric vehicle, a hydrogen energy vehicle, and a hybrid electric vehicle.

2) The data transmission module uses a fifth generation mobile communication technology (5G) as a subject information transmission communication mode to assist one or two of wireless communication modes of wireless fidelity/bluetooth (WiFi/BT), dedicated short range communications (DSRC), etc. to transmit data between the in-vehicle unit, the road side unit, and each module;

3) the traffic control module obtains, according to traffic state information provided by the information collection module, a behavior strategy a, an objective g and a reward r that are optimal in real time, sends the strategy to the in-vehicle unit for real-time control of the vehicles, and further packages a traffic state information set to be sent to the intelligent optimization module; and 4) the intelligent optimization module includes a training sub-module and a data sub-module. The data sub-module stores data sent by the traffic control module, and applies an artificial intelligence data exploration method to obtain a number of data pairs for storage; and the training sub-module utilizes a reward function to optimize an artificial intelligence based ramp merging multi-objective control model according to the data provided by the data sub-module, and transmits an optimized model to the traffic control module.

The control area includes an intersection of a main road and a ramp, a ramp merging area, and partial road segments of a main line and the ramp. It is worth noting that a control range of the control area is a communication range of the road side unit, which sees FIG. 1 for details.

Figure 2:
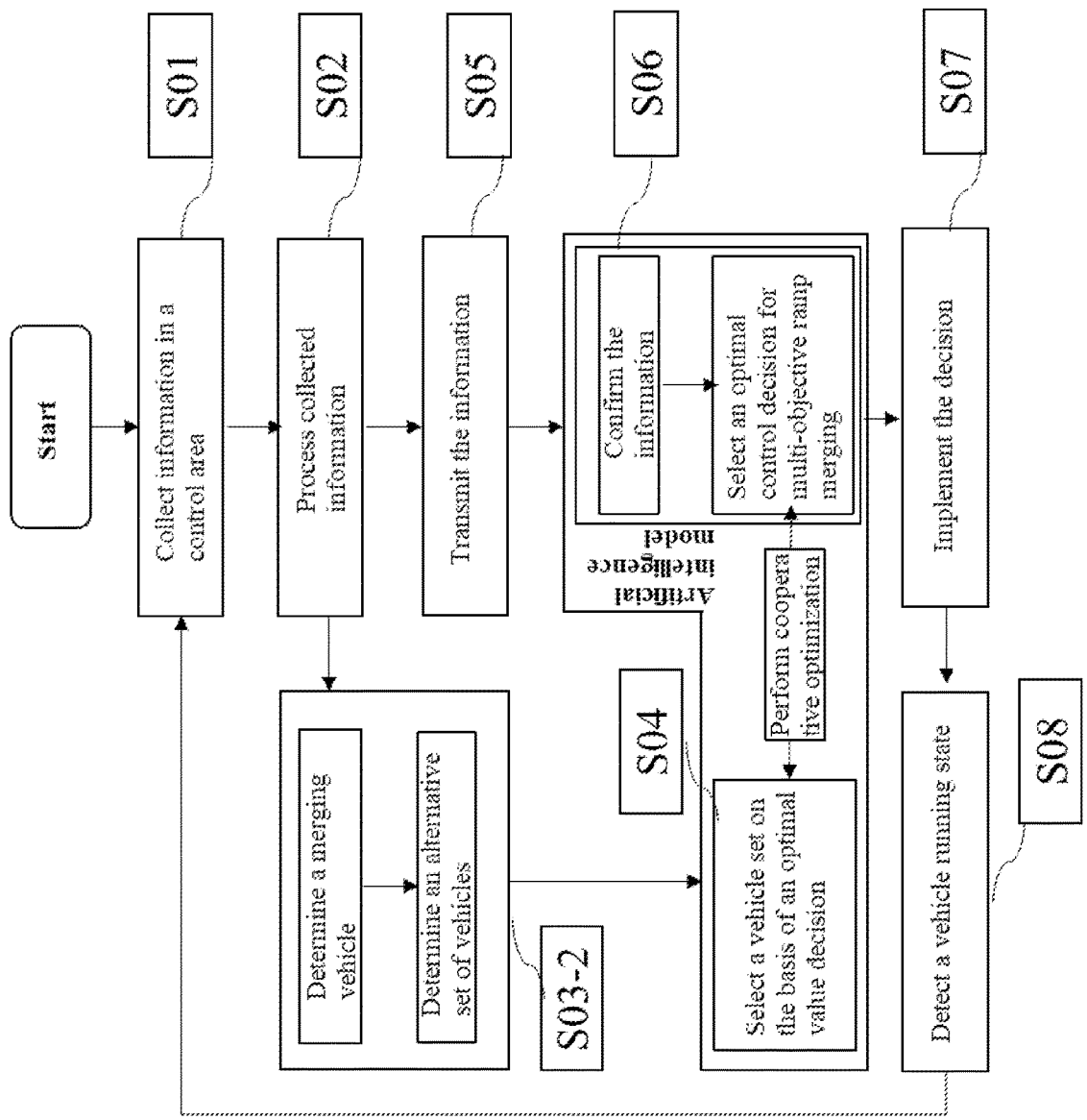
FIG. 2 is an architecture diagram of a multi-objective optimization control method for cooperative ramp merging of connected vehicles on a highway of the present invention.

As shown in FIG. 2, a multi-objective optimization control method for cooperative ramp merging of connected vehicles on a highway provided in the present invention includes:

S01 obtain, by an information collection module, state data of vehicles in a control area;

S02 perform, by the information collection module, data analysis, information fusion, etc. on the collected data by means of an intelligent data analysis model;

S03 according to the state data of the vehicles in the control area, construct a set AL of alternatives of a ramp merging vehicle, an auxiliary vehicle and a guidance vehicle;

S04 input the set of alternatives into an artificial intelligence based ramp merging multi-objective control model separately, and further determine selection of the auxiliary vehicle and the guidance vehicle by means of an optimal value strategy;

S05 transmit, by a transmission module, the vehicles selected in S04 and vehicle related collected data to a control module;

S06 confirm, by a traffic control module, the vehicles to which instructions are sent to implement a decision on the basis of the artificial intelligence based ramp merging multi-objective control model, a frame of the artificial intelligence based ramp merging multi-objective control model being a reinforcement learning actor-critic algorithm;

S07 transmit, by the transmission module, decision information to in-vehicle units of controlled vehicles to achieve a vehicle safe, efficient and energy-saving ramp merging objective, and the controlled vehicles are the ramp merging vehicle and the auxiliary vehicle; and S08 collect state information data pairs of the controlled vehicles under a control strategy, and store the state information data pairs of the controlled vehicles into a data sub-module to form a closed loop control.

In S03 and S04, a selection method for the merging vehicle, the auxiliary vehicle and the guidance vehicle is based on a framework of the optimal value strategy algorithm framework, and includes:

1) select the merging vehicle: set a vehicle, of which a front bumper is closest to a ramp exit line, on the ramp as the merging vehicle, and obtain state information, such as speeds, positions, and accelerations, of all the vehicles in the control area in first t time steps;

2) according to position information of all the vehicles, preliminary select each z main road vehicles in the rear of and in front of the merging vehicle as alternative vehicles of the auxiliary vehicle and the guidance vehicle on the basis of front and rear relations between main line vehicles and the merging vehicle;
3) in all the alternative vehicles, select two vehicles that are adjacent to each other as a group of guidance vehicle and auxiliary vehicle, to construct an alternative set AL of the guidance vehicle and the auxiliary vehicle of the merging vehicle;
4) use a traversal method to substitute combinations in the alternative set AL into the artificial intelligence based ramp merging multi-objective control model separately, and determine the merging vehicle, the auxiliary vehicle, and the guidance vehicle that are finally selected on the basis of a value function 0% of the model; and
5) control and adjust, by the artificial intelligence based ramp merging multi-objective control model, accelerations of the merging vehicle and auxiliary vehicle according to the selected guidance vehicle, to solve multi-objective optimal control, so as to successfully merge the merging vehicle into a main line, and simultaneously ensuring energy consumption optimization of the merging vehicle and efficient and safe traffic of a road. Specifically, constructing a problem mathematical model and carrying out optimization solution on the basis of reinforcement learning are specifically included.

The constructing a problem mathematical model includes:
1) set a safe merging moment as $\hat{t}$ to construct a position and speed relation to be satisfied by the guidance vehicle, the auxiliary vehicle, and the ramp merging vehicle at the safe merging moment:

$$x_m(\hat{t}) \leq x_l(\hat{t}) - (L_1 + s_0) - \tau v_m(\hat{t}) \quad (1)$$

$$x_m(\hat{t}) \geq x_f(\hat{t}) + (L_1 + s_0) + \tau v_f(\hat{t}) \quad (2)$$

$$v_m(\hat{t}) \leq v_l(\hat{t}) \quad (3)$$

$$v_m(\hat{t}) \geq v_f(\hat{t}) \quad (4)$$

$$x_m(\hat{t}) \in [d_{min}, d_{max}] \quad (5)$$

$x_l$, $v_l$ and $a_l$ representing a position, a speed, and an acceleration of the guidance vehicle; $x_f$, $v_f$ and $a_f$ representing a position, a speed, and an acceleration of the auxiliary vehicle; $x_m$, $v_m$ and $a_m$ representing a position, a speed, and an acceleration of the ramp merging vehicle; $\tau$ being a constant time interval, $L_1$ being a length of the vehicle, so being a pause gap, $d_{min}$ and $d_{max}$ being a start point and an end point of the merging area respectively, and the merging area having a length of $d_{max} - d_{min}$; and the equation sequentially representing, from top to bottom, that the ramp merging vehicle is at the rear of the guidance vehicle, the ramp merging vehicle is in front of the auxiliary vehicle, the ramp merging vehicle and the guidance vehicle have a consistent speed, the ramp merging vehicle and the auxiliary vehicle have a consistent speed, and the ramp merging vehicle is safely merged from the acceleration lane into the main road in the selected merging area; and
2) under the condition of satisfying 1), further construct an objective function C including, but not limited to, objectives of driving comfort, vehicle energy consumption, traffic efficiency, etc.;

$$\min C(\hat{t}) = \min \int_0^{\hat{t}} (c^1 C_1(\hat{t}) + c^2 C_2(\hat{t}) + \ldots + c^n C_n(\hat{t})) \quad (6)$$

$C_n(\hat{t})$ representing cost functions of different objectives, and $c^n$ representing parameters.

As the preferred solution of the method of the present invention, the artificial intelligence based ramp merging multi-objective control model is solved by using a reinforcement learning actor-critic algorithm, which specifically includes:
1) establish a state space $\mathcal{S}$ and a behavior space $\mathcal{A}$: selecting, according to the state data of the guidance vehicle, the auxiliary vehicle, and the ramp merging vehicle, six-dimensional state information $s=\{x_l, x_m, x_f, v_l, v_m, v_f\}$ to represent the most relevant influence factor in an environment, $s \in \mathcal{S}$, and select a control behavior strategy $a=\{a_m, a_f\}$, $a \in \mathcal{A}$ on the basis of a control object.
2) establish an optimal objective: according to a vehicle constraint relation at a safe merging moment $\hat{t}$, construct an optimal objective space set $g^*=\{g^*_1, g^*_2, g^*_3, g^*_4, g^*_5\}$ for ramp merging, $g^* \in \mathcal{G}$, $\mathcal{G}$ being an objective space set, $g^*_1$ representing that equation (1) that the merging vehicle is at the rear of the guidance vehicle is satisfied, $g^*_2$ representing that equation (2) that the ramp merging vehicle is in front of the auxiliary vehicle is satisfied, $g^*_3$ representing that equation (3) that the ramp merging vehicle and the guidance vehicle have a consistent speed is satisfied, $g^*_4$ representing that equation (4) that the ramp merging vehicle and the auxiliary vehicle have a consistent speed is satisfied, and $g^*_5$ representing that equation (5) that the ramp merging vehicle is safely merged from the acceleration lane into the main road in the selected merging area is satisfied;
3) construct an objective space: on the basis of classifications included by the optimal objective space set $g^*=\{g^*_1, g^*_2, g^*_3, g^*_4, g^*_5$ in 2), establish the objective space set $\mathcal{G}$ to satisfy $g=\{g_1, g_2, g_3, g_4, g_5\}$, $g_1$ representing a position relation between the ramp merging vehicle and the guidance vehicle, $g_2$ representing a position relation between the ramp merging vehicle and the auxiliary vehicle, $g_3$ representing a speed relation between the ramp merging vehicle and the guidance vehicle, $g_4$ representing a speed relation between the ramp merging vehicle and the auxiliary vehicle, and $g_5$ representing a relation between a position of the ramp merging vehicle and the merging area; and
4) construct rewards: with a reward function being r: $\mathcal{S} \times \mathcal{A} \times \mathcal{G} \to R$, introduce, according to safe, efficient and comfortable traveling requirements, at least two short-term objective rewards under the condition that the reward r(s, a, g*) at each time step includes a long-term objective merging reward QUOTE,
(1) the long-term objective merging reward $R_m(t)$ that must be included being represented as follows: and $$R_m(t) = \begin{cases} 1, & \text{safe successful merging} \\ 0, & \text{the merging vehicle can(may)be merged, but} g^* \text{ is not satisfied} \\ -1, & \text{others} \end{cases} \quad (7)$$

(2) other objectives being capable of including, but not limited to, energy conservation, stability, comfort, efficiency, etc. Construction may refer to:
  a. construct a driving energy consumption reward $R_e(t)$: in consideration of battery efficiency and energy consumption, use an ampere-time integration method to construct a descent relation model of vehicle state of charge (SOC):

$$\Delta SOC(t) = \frac{\int_0^t \left(V_{oc} - \sqrt{V_{oc}^2 - 4R_{int}P_b(t)}\right)dt}{2R_{int}Q_c} \quad (8)$$

$V_{oc}$ being open circuit voltage, $R_{int}$ being a resistance, $P_b(t)$ being battery power at a time t, and $Q_c$ being battery capacity.

Therefore, an energy-saving reward includes SOC situations of the ramp merging vehicle and the auxiliary vehicle as follows:

$$R_e(t) = \Delta SOC_m(t) + \Delta SOC_f(t) \quad (9)$$

b. construct a battery life reward $R_b(t)$ according to $$\Delta SOH(t) = \frac{1}{2N(|P_b(t)|)E_0(0)}\int_0^t |P_b(t)|dt \quad (10)$$

N being the number of battery cycles, and $E_0(0)$ being standard battery capacity energy.

Therefore, the battery life reward is state of health (SOH) situations of the ramp merging vehicle and the auxiliary vehicle as follows:

$$R_b(t) = \Delta SOH_m(t) + \Delta SOH_f(t) \quad (11)$$

c. construct a stability reward $R_s(t)$: without considering lateral movement of the vehicle, see the stability reward as a change of an actual acceleration, the maximum acceleration being $a_{max}=3$ m/s², and a specific model is as follows:

$$R_s(t) = \frac{|a_f(t)|}{a_{max}} \quad (12)$$

d. construct a comfort reward construction $R_p(t)$: in order to reduce bump of the merging vehicles and improve comfort of passengers, $j_{max}$ representing a maximum allowable bump value, m/s³ being taken as the unit, and the model is as follows:

$$R_p(t) = \frac{|\nabla a_m(t)| + |\nabla a_{f(t)}|}{j_{max}} \quad (13)$$

A coupled Chebyshev based multi-objective reward optimization method specifically includes:
  a. determine optimized reward terms: under the condition of assuming that the number of a variety of introduced real-time short-term objectives after successful merging is $n_r$, determine the number of the optimized reward terms for a merging problem as $n_r$;
  b. determine a super-ideal optimal value of each reward: construct the super-ideal optimal value $r^{**}_i = r^*_i + \vartheta_i$ (i=1, 2, . . . , $n_r$) of each objective, $r^*_i$ being an ideal value, and $\vartheta_i$ being a constant according to selection of empirical data, and representing a degree that the super-ideal optimal value is better than the ideal value;
  c. construct a generalized weighted Chebyshev optimization model for a multi-objective problem: with setting $\lambda_i$ as a Chebyshev weight of a short-term objective, transform the multi-objective problem into a generalized weighted Chebyshev multi-objective problem as follows:

$$\min\left\{F_c + p\sum_{i=1}^{n_r}(r^{**}_i - r_i)\right\} \quad (14)$$

The following condition being satisfied:

$F_c - \lambda_i(r^{**}_i - r_i) \geq 0$  $1 \leq i \leq n_r$ $r_i$ being an unrestricted variable $1 \leq i \leq n_r$ $F_c \geq 0$ \quad (15)

$F_c$ being a weighted Chebyshev norm, $F_c = \max\{\lambda_i(r^{}_i - r_i)\}$ representing a maximum deviation between each objective and the super-ideal optimal value; and $$\rho\sum_{i=1}^{n_r}(r^{}_i - r_i)$$

being a term ensuring the stable algorithm, usually, $\rho=0.001$, and a computation equation of $\lambda_i$ being referred to as follows:

$$\lambda_i = \begin{cases} \frac{1}{(r^{}_i - r_i)}\left[\sum_{i=1}^{n_r}\frac{1}{(r^{}_i - r_i)}\right]^{-1} & r_i \neq r^{}_i \\ 1 & r_i = r^{}_i \\ 0 & r_i \neq r^{}_i, \text{ but } 3i, \text{ and } r_i = r^{}_i \end{cases} \quad (16)$$

c. construct a reward function as:

$$R_m(t) = \begin{cases} 1, & \text{safe successful merging} \\ 0, & \text{the merging vehicle can(may)be merged, } butg^* \text{ is not satisfied.} \\ -1, & \text{others} \end{cases} \quad (17)$$

5) obtain a data link: according to state, objective, strategy and reward data of the t-th time step obtained from 1) to 4), obtain the data link $(s_t\|g^*, a, r, s_{t+1}\|g^*)$, and store the data into an intelligent optimization module, $s\|g^*$ representing a connection between a state s and an objective $g^*$, and r not including the short-term objective $R_e(t)$, $R_s(t)$ when $g^*$ (Rm(t) being valued as 1, safe successful merging) is not completed. connection between a state s and an objective $g^*$, and r not including the short-term objective $R_e(t)$, $R_s(t)$ when $g^*$(Rm(t) being valued as 1, safe successful merging) is not completed.
  6) expand data exploration, and optimize the objective space: according to 4) and 5), it may be found that data satisfying $g^*$ is difficult to obtain, because $g^*$ is a fixed final objective and has extremely limited guidance significance for the real-time rewards. Therefore, a multi-experience replay based virtual objective construction algorithm is further provided, to introduce virtual objectives, to optimize the objective space, and simultaneously expand the data exploration. The provided multi-experience replay based virtual objective construction algorithm includes:
(1) construct multi-experience virtual objectives and optimize the objective space at a t time step: on the basis of the objective g* and the data link $(s_t\|g^*, a, r, s_{t+1}\|g^*)$ at the t time step, construct a fully connected neural network H, $g=H_\varphi(s, g^*)$ taking $\varphi$ as a parameter, to obtain/virtual objectives in a current state: $g^1=H_\varphi(s_t, g^*)$, $g^2=H_\varphi(s_{t+1}, g^*)$, ..., $g^l=H_\varphi(s_{t+l-1}, g^*)$;
(2) optimize data exploration on the basis of the optimized objective space: construct l virtual objective data links on the basis of the obtained l virtual objectives: $(s_t\|g^1, a, r, s_{t+1}\|g^1)$, $(s_t\|g^2, a, r, s_{t+1}\|g^2)$, ..., $(s_t\|g^l, a, r, s_{t+1}\|g^l)$; and store the virtual objective data links into the intelligent optimization module;
(3) optimize data exploration at a full time step: repeat (1) and (2) for each time step to complete data exploration and objective space optimization at all time steps;
(4) select virtual objective effectiveness on the basis of an artificial intelligence model: train the artificial intelligence model according to an optimized data set, and select, according to a training result, an optimal virtual objective data link at each time step; and
(5) verify the fully connected neural network H for the virtual objectives: according to the optimal virtual objective data link at each time step, verify the parameter $\varphi$ of the fully connected neural network H for the virtual objectives, to constantly improve accuracy of generation of the virtual objectives, and improve a training speed of the algorithm.
in each time step, according to the data link stored by the intelligent optimization module, on the basis of an actor-critic algorithm framework, train a merging control strategy by means of a deep neural network taking $\theta_A$ as a parameter, the strategy directly outputting an action to control acceleration magnitudes and states of the ramp merging vehicle and the auxiliary vehicle and objective inputs, strategy optimization aiming at to find an optimal behavior strategy a, to maximize a return expectation of a whole trip, which specifically includes:
(1) according to a Bellman function, construct an optimal value function as:

$$Q_\pi(s, a, g) = \sum_{s',r} p(s', r|(s, g), a)\left[r + \gamma\max_{a'}Q(s', a, g)\right] \quad (18)$$

$Q_\pi$ being a value function, $\gamma$ being a loss factor, s, a, g being a state, a behavior strategy, and an objective at a current time step respectively, and s', a', g' being a state, a behavior strategy, and an objective at a next time step respectively;
(2) according to (1), determine a standard time difference update equation as:

$$Q_\pi(s, a, g) := Q_\pi(s, a, g) + \zeta\left(r + \gamma\max_{a'}Q_\pi(s_{t+1}, a', g') - Q_\pi(s, a, g)\right), \quad (19)$$

$\zeta$ being a learning rate; and
utilize a critic network taking $\theta_c$ as a parameter to estimate a Q value according to an update rule of equation (16), so as to construct a loss function of the critic network as follows:

$$J_c(\theta_c)=(Q_\pi(s,a,g|\theta_c)-(r+\gamma Q_\pi(s',g',\pi(s',g'|\theta_A)|\theta_c)))^2 \quad (20),$$

$\theta_c$ being a critic network parameter;

(3) utilize a stochastic gradient descent algorithm to update a critical network parameter by minimizing the loss function as follows:

$$\Delta\theta_c=(\zeta\nabla_{\theta_c}L_c(\theta_c)) \quad (21)$$

$$\Delta\theta_A=(\zeta\nabla_\zeta Q(s,a,g|\theta_c)\nabla_{\theta_A}\pi(s,g|\theta_A)) \quad (22),$$

$\nabla$ representing a gradient; and
(4) output an optimal control strategy under the driving state by means of forward delivery of a trained network:

$$a=\pi(s,g|\theta_A) \quad (23).$$

obtain the optimal control strategy, to achieve optimal control of the highway scenario oriented multi-objective optimization control method and system for cooperative ramp merging of connected vehicles on a highway by means of each module, thereby achieving efficient, safe, and energy-saving driving in the ramp area.

What is described above is merely the preferred example of the present invention, and is not intended to limit the present invention in any form. Any amendments or equivalent changes made according to the technical essence of the present invention still fall within the scope of the present invention.

What is claimed is:
1. A multi-objective optimization control method for cooperative ramp merging of connected vehicles on a highway, comprising:
step 1, collecting state data of vehicles in a control area of the highway, and analyzing and processing the state data, the control area comprising an intersection of a main road and a ramp, a merging area, and partial road segments of the main road, the ramp and an acceleration lane of the highway, a range of the control area being a communication range of a road side unit, the road side unit being arranged at the intersection of the main road and the ramp of the highway, and the merging area being a preselected area comprising the partial road segments of the acceleration lane and road segments of the main road parallel to the partial road segments of the acceleration lane;
step 2, constructing a set of alternatives for a ramp merging vehicle, an auxiliary vehicle, and a guidance vehicle according to the state data of the vehicles in the control area;
step 3, inputting the set of alternatives into an artificial intelligence based ramp merging multi-objective control model separately, and further determining selection of the auxiliary vehicle and the guidance vehicle by means of an optimal value strategy; wherein
the optimal value strategy selected for the ramp merging vehicle, the guidance vehicle, and the auxiliary vehicle is as follows:
i) selecting the merging vehicle: setting a vehicle, of which a front bumper is closest to a ramp exit line, on the ramp as the merging vehicle, and obtaining state information of all the vehicles in the control area in first t time steps;
ii) according to position information of all the vehicles, preliminary selecting each z main road vehicles in the rear of and in front of the merging vehicle as alternative vehicles of the auxiliary vehicle and the guidance vehicle on the basis of front and rear relations between main line vehicles and the merging vehicle;

iii) in all the alternative vehicles, selecting two vehicles that are adjacent to each other as a group of guidance vehicle and auxiliary vehicle, to construct an alternative set AL of the guidance vehicle and the auxiliary vehicle of the merging vehicle; and iv) using a traversal method to substitute combinations in the alternative set AL into the artificial intelligence based ramp merging multi-objective control model separately, and determining the merging vehicle, the auxiliary vehicle, and the guidance vehicle that are finally selected on the basis of a value function $Q_\pi$ of the model;

step 4, according to the auxiliary vehicle, the guidance vehicle, and the merging vehicle that are selected, controlling and adjusting accelerations of the auxiliary vehicle and the guidance vehicle, to ensure safe merging of the ramp merging vehicle from the acceleration lane into the main road in the selected merging area; and step 5, collecting state data of the ramp merging vehicle and the auxiliary vehicle, of which the accelerations are adjusted, and returning to step 4 to adjust accelerations at a next moment.

2. The multi-objective optimization control method for cooperative ramp merging of connected vehicles on a highway of claim 1, wherein in step 1, the state data of the vehicles comprises positions, speeds, power battery states, and corresponding moment information of the vehicles in the control area.

3. The multi-objective optimization control method for cooperative ramp merging of connected vehicles on a highway of claim 1, wherein in step 1, the analyzing and processing the state data comprises: analyzing the data, extracting features, and fusing information.

4. The multi-objective optimization control method for cooperative ramp merging of connected vehicles on a highway according to claim 1, wherein the state information of all the vehicles in the control area in the first t time steps comprises speeds, positions, and accelerations.

5. The multi-objective optimization control method for cooperative ramp merging of connected vehicles on a highway according to claim 1, wherein in step 4) of the optimal value strategy selected for the merging vehicle, the auxiliary vehicle, and the guidance vehicle, constructing an objective function and constraints of the artificial intelligence based ramp merging multi-objective control model successfully merged into a moment comprises:

i) setting t as a safe merging moment to construct a position and speed relation to be satisfied by the guidance vehicle, the auxiliary vehicle, and the ramp merging vehicle at the safe merging moment:

$$xm(t) < x_l(t) - (L_1 + s_0) - (_m 1( \ )C1) \quad (1)$$

$$xm(t) > x_f(t) + (L_1 + so) + Tvf(t) \quad (2)$$

$$1'_m(t) < v_1( \ ) \quad (3)$$

$$vo_m(t); > \quad (4)$$

$$xm(t)E[d\ min, d\ max] \quad (5)$$

$x_l$, v, and $a_l$ representing a position, a speed, and an acceleration of the guidance vehicle;

$x_f$, $v_f$ and $a_f$ representing a position, a speed, and an acceleration of the auxiliary vehicle;

$x_m$, $v_m$ and $a_m$ representing a position, a speed, and an acceleration of the ramp merging vehicle; r being a constant time interval, $L_1$ being a length of the vehicle, so being a pause gap, $d_{min}$ and $d_{max}$ being a start point and an end point of the merging area respectively, and the merging area having a length of $dm_{ax} - d_{min}$; and the equation sequentially representing, from top to bottom, that the ramp merging vehicle is at the rear of the guidance vehicle, the ramp merging vehicle is in front of the auxiliary vehicle, the ramp merging vehicle and the guidance vehicle have a consistent speed, the ramp merging vehicle and the auxiliary vehicle have a consistent speed, and the ramp merging vehicle is safely merged from the acceleration lane into the main road in the selected merging area; and ii) under the condition of satisfying 1), further constructing an objective function C comprising, but not limited to, objectives of driving comfort, vehicle energy consumption, traffic efficiency, etc.;

$$\min C(\hat{t}) = \min f(c^1 C_1(f) + c^2 C_2(f) + + C_n(f)) \quad (6)$$

$C_n(\hat{t})$ representing cost functions of different objectives, and $c^n$ representing parameters.

6. The multi-objective optimization control method for cooperative ramp merging of connected vehicles on a highway according to claim 1, wherein in step 4) of the optimal value strategy selected for the merging vehicle, the guidance vehicle and the auxiliary vehicle, the artificial intelligence based ramp merging multi-objective control model is solved by using a reinforcement learning actor-critic algorithm, which specifically comprises:

i) establishing a state space S and a behavior space A: selecting, according to the state data of the guidance vehicle, the auxiliary vehicle, and the ramp merging vehicle, six-dimensional state information $s = \{x_l, X_m, x_f, V_l, v_m, v_f\}$ to represent the most relevant influence factor in an environment, sE S, and selecting a control behavior strategy $a = \{a_m, a_f\}$, a E A on the basis of a control object;

ii) establishing an optimal objective: according to a vehicle constraint relation at a safe merging moment t, constructing an optimal objective space set $g^* = \{g^*_1, g^*_2, g^*_3, g^*_4, g^*\}$ for ramp merging, $g^* E g, g$ being an objective space set, $g^*_1$ representing that equation (1) that the merging vehicle is at the rear of the guidance vehicle is satisfied, $g^*$ representing that equation (2) that the ramp merging vehicle is in front of the auxiliary vehicle is satisfied, $g^*$ representing that equation (3) that the ramp merging vehicle and the guidance vehicle have a consistent speed is satisfied, $g^*$ representing that equation (4) that the ramp merging vehicle and the auxiliary vehicle have a consistent speed is satisfied, and $g_5$ representing that equation (5) that the ramp merging vehicle is safely merged from the acceleration lane into the main road in the selected merging area is satisfied;

iii) constructing an objective space: on the basis of classifications included by the optimal objective space set $\#^* = \{g^*_1, g^*_2, g^*_3, g^*_4, g^*\}$ in 2), establishing the objective space set g to satisfy $9 = \{9_1, 9_2, 9_3, 9_4, 9_5\}$, $g_1$ representing a position relation between the ramp merging vehicle and the guidance vehicle, $9_2$ representing a position relation between the ramp merging vehicle and the auxiliary vehicle, $9_3$ representing a speed relation between the ramp merging vehicle and the guidance vehicle, $g_4$ representing a speed relation between the ramp merging vehicle and the auxiliary vehicle, and $g_5$ representing a relation between a position of the ramp merging vehicle and the merging area;

iv) constructing rewards: with a reward function being r: S XAxg→R, introducing, according to safe, efficient and comfortable traveling requirements, at least two short-term objective rewards under the condition that the reward r(s, a, g*) at each time step includes a long-term objective merging reward Rm(t), the long-term objective merging reward Rm(t) that must be included being represented as follows:

$R_m(t)$={0, 1, safe successful merging $R_m(t)$=0, the merging vehicle can (may)be merged, but g* is not satisfied (7)-1, others v) obtaining a data link: according to state, objective, strategy and reward data of the $t^{th}$ time step obtained from 1) to 4), obtaining the data link $(s_t\|g^*, a, r, s_{t+2}\|g^*)$, and storing the data into an intelligent optimization module, s∥g* representing a connection between a state s and an objective g*;

vi) expanding data exploration, and optimizing the objective space: further providing a multi-experience replay based virtual objective construction algorithm, to introduce virtual objectives, to optimize the objective space, and simultaneously expand the data exploration; and vii) in each time step, according to the data link stored by the intelligent optimization module, on the basis of an actor-critic algorithm framework, training a merging control strategy by means of a deep neural network taking $8_A$ as a parameter, the strategy directly outputting an action to control acceleration magnitudes and states of the ramp merging vehicle and the auxiliary vehicle and objective inputs, strategy optimization aiming at to find an optimal behavior strategy a, to maximize a return expectation of a whole trip, and finally, the optimal control strategy being output by means of forward delivery of a trained network: a=rc(s, g I $Q_A$).

7. The multi-objective optimization control method for cooperative ramp merging of connected vehicles on a highway according to claim 6, wherein the short-term objective rewards in construction of the rewards of the reinforcement learning actor-critic algorithm comprises, but not limited to, an energy-saving reward $R_e(t)$, a comfort reward $R_p(t)$, an efficient traffic reward $R_s(t)$, and a battery state reward $R_p(t)$; and a coupled Chebyshev based multi-objective reward optimization method for the reinforcement learning actor-critic algorithm comprises:

(i) determining optimized reward terms: under the condition of assuming that the number of a variety of introduced real-time short-term objectives after successful merging is $n_r$, determining the number of the optimized reward terms for a merging problem as $n_r$;

(ii) determining a super-ideal optimal value of each reward: constructing the super-ideal optimal value $r^{**}_i = r^*_i + \vartheta_i$ (i=1, 2, ..., $n_r$ of each objective, $r^*_i$ being an ideal value, and $\vartheta_i$ being a constant according to selection of empirical data, and representing a degree that the super-ideal optimal value is better than the ideal value;

(iii) constructing a generalized weighted Chebyshev optimization model for a multi-objective problem: with setting $\lambda_i$ as a Chebyshev weight of a short-term objective, transforming the multi-objective problem into a generalized weighted Chebyshev multi-objective problem as follows:

$$\min\{F_c + \rho \sum_{i=1}^{n_r}(r^{**}_i - r_i)\} \quad (14)$$

The following condition being satisfied:

$F_c - \lambda_i(r^{**}_i - r_i) \geq 0$  $1 \leq i \leq n_r$ $r_i$ being an unrestricted variable $1 \leq i \leq n_r$ $$F_c \geq 0 \quad (15)$$

$F_c$ being a weighted Chebyshev norm, $F_c = \max\{\lambda_i(r^{}_i - r_i)\}$ representing a maximum deviation between each objective and the super-ideal optimal value; and $$\rho \sum_{i=1}^{n_r}(r^{}_i - r_i)$$

being a term ensuring the stable algorithm, usually, $\rho=0.001$, and a computation equation of $\lambda_i$ being referred to as follows:

$$\lambda_i = \begin{cases} \left[\frac{1}{(r^{}_i - r_i)}\left[\sum_{i=1}^{n_r}\frac{1}{(r^{}_i - r_i)}\right]\right]^{-1} & r_i \neq r^{}_i \\ 1 & r_i = r^{}_i \\ 0 & r_i \neq r^{}_i, \text{ but } 3i, \text{ and } r_i = r^{}_i \end{cases} \quad (16)$$

(iv) constructing a reward function as:

$$R_m(t) = \begin{cases} 1, & \text{safe successful merging} \\ 0, & \text{the merging vehicle can(may)be merged, but} g^* \text{is not satisfied.} \\ -1, & \text{others} \end{cases} \quad (17)$$

8. The multi-objective optimization control method for cooperative ramp merging of connected vehicles on a highway according to claim 6, wherein the multi-experience replay based virtual objective construction algorithm provided in construction of the rewards of the reinforcement learning actor-critic algorithm comprises:

(i) constructing multi-experience virtual objectives and optimizing the objective space at a t time step: on the basis of the objective g* and the data link $(s_t\|g^*, a, r, s_{t+1}\|g^*)$ at the t time step, constructing a fully connected neural network H, $g=H_\varphi(s, g^*)$ taking φ as a parameter, to obtain 1 virtual objectives in a current state: $g^1=H_\varphi(s_t, g^*)$, $g^2=H_\varphi(s_{t+1}, g^*)$, ..., $g^l=H_\varphi(s_{t+1-1}, g^*)$;

(ii) optimizing data exploration on the basis of the optimized objective space: constructing 1 virtual objective data links on the basis of the obtained 1 virtual objectives:

$(s_t\|g^1, a, r, s_{t+1}\|g^1)$, $(s_t\|g^2, a, r, s_{t+1}\|g^2)$, ..., $(s_t\|g^l, a, r, s_{t+1}\|g^l)$; and storing the virtual objective data links into the intelligent optimization module;

(iii) optimizing data exploration at a full time step: repeating ① and ② for each time step to complete data exploration and objective space optimization at all time steps;

(iv) selecting virtual objective effectiveness on the basis of an artificial intelligence model: training the artificial intelligence model according to an optimized data set, and selecting, according to a training result, an optimal virtual objective data link at each time step; and (v) verifying the fully connected neural network H for the virtual objectives: according to the optimal virtual objective data link at each time step, verifying the parameter φ of the fully connected neural network H for the virtual objectives, to constantly improve accuracy of generation of the virtual objectives, so as to ensure algorithm performance and a training speed.

9. The multi-objective optimization control method for cooperative ramp merging of connected vehicles on a highway according to claim 1, wherein a system based on the multi-objective optimization control method for cooperative ramp merging of connected vehicles on the highway comprises: an information collection module, a data transmission module, a traffic control module, and an intelligent optimization module, wherein the information collection module is used for collecting state data of vehicles in a control area of a highway, analyzing and processing the state data, and selecting a ramp merging vehicle, an auxiliary vehicle, and a guidance vehicle;

the information collection module comprises an in-vehicle unit, and a road side unit, the road side unit being arranged at an intersection of a main road and a ramp of a highway, the road side unit being used for collecting positions, speeds and corresponding moment information of the vehicles in the control area, and being further used for collecting time of determining the ramp merging vehicle, and time when a front bumper reaches a ramp exit line, and the in-vehicle unit being used for collecting power battery states and corresponding moment information of the vehicles in the control area;

the data transmission module is used for using a mobile communication technology as a subject information transmission communication mode to assist one or two of wireless communication modes of wireless fidelity/bluetooth (WiFi/BT), and dedicated short range communications (DSRC) to transmit data between the information collection module and the traffic control module, the traffic control module and the intelligent optimization module;

the traffic control module is used for obtaining, according to the state data of the vehicles provided by the information collection module, a behavior strategy a, an objective g and a reward r that are optimal in real time, sending the behavior strategy to the in-vehicle unit for real-time control of the vehicles, and further sending the behavior strategy a, the objective g and the reward r that are optimal to the intelligent optimization module; and the intelligent optimization module is used for storing data sent by the traffic control module, optimizing a ramp merging multi-objective control model on the basis of an alternative set AL of the vehicles selected in step 3) and an optimization algorithm provided in step 4), and transmitting the optimized model to the traffic control module.

* * * * *